United States Patent Office 3,389,987
Patented June 25, 1968

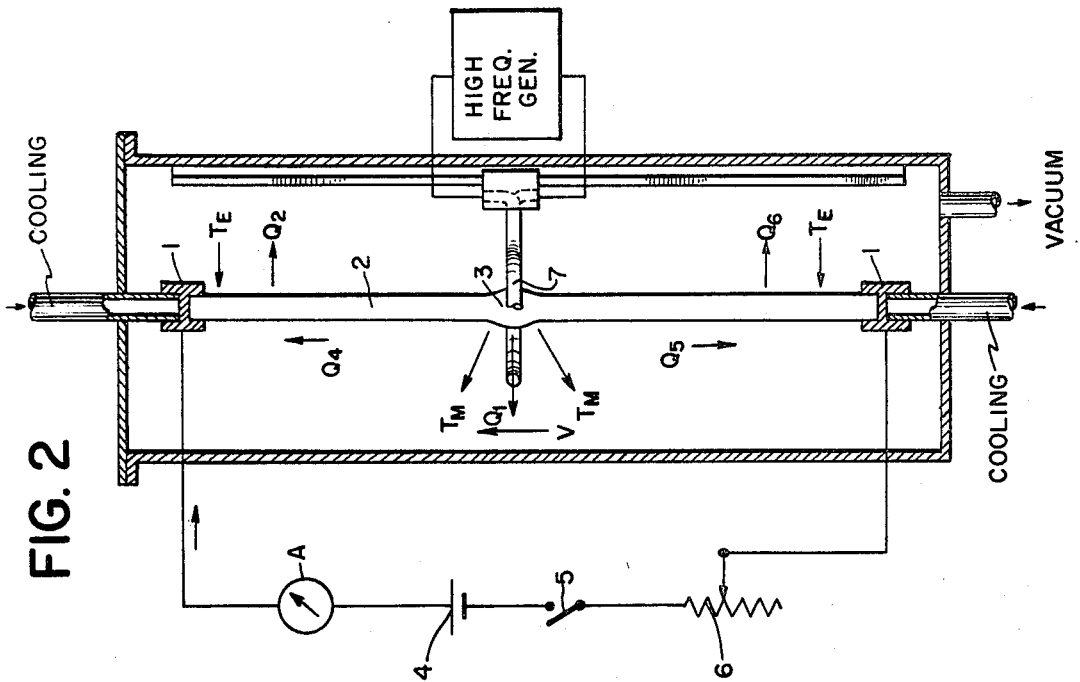
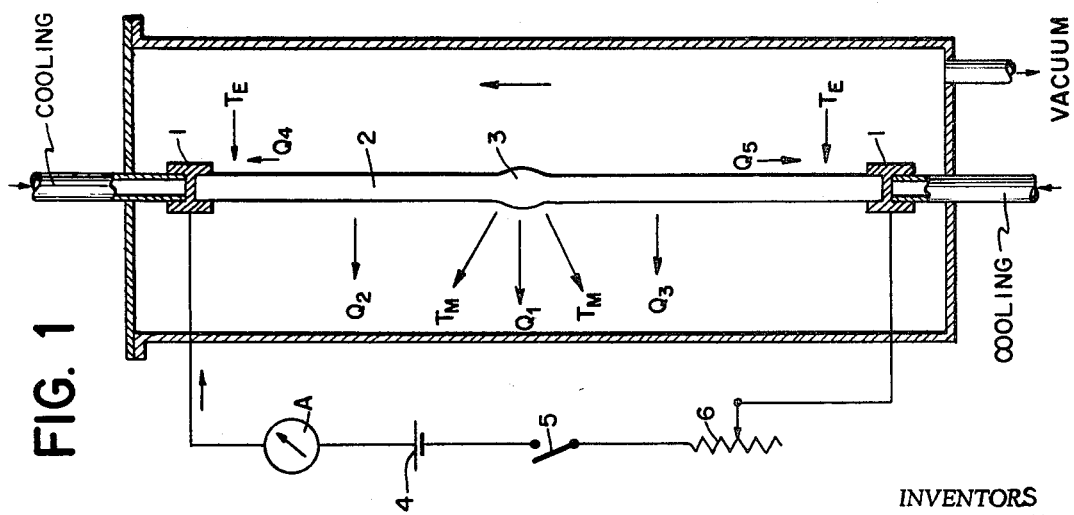

3,389,987
PROCESS FOR THE PURIFICATION OF MATERIALS IN SINGLE CRYSTAL PRODUCTION
Alexander Lebek, Berlin-Weissensee, and Siegfried Raab, Berlin-Johannisthal, Germany, assignors to Deutsche Akademie der Wissenschaften zu Berlin, Berlin-Adlershof, Germany
Filed June 14, 1965, Ser. No. 463,723
2 Claims. (Cl. 75—10)

ABSTRACT OF THE DISCLOSURE

A method of zone melting an elongated body of semiconductor material is disclosed, especially for purifying the material and/or for producing a single crystal, in which a direct current is passed through the body, which has a magnitude corresponding to the Peltier or the Peltier and Thomson coefficient of the semiconductor material and to the speed of movement of the molten zone through the body, in which an external heating zone is maintained around the molten zone, and in which the heating zone is moved along the length of the body with a speed corresponding to the speed of movement of the molten zone through the body, while the end portions of the body are variably cooled for purposes of influencing the Thomson effect.

---

This invention relates to a process for the purification of a material, more particularly to a zone refining process with or without a crucible for the purification of materials for single crystal production.

For purifying materials and in particular materials exhibiting semi-conductor properties a process called zone refining is commonly employed. The initial purification of materials such as germanium and silicon used for the production of semi-conductors typically involves reactions which produce the chemical compounds germanium and silicon tetrachloride or dioxide. These compounds can be processed to give germanium or silicon of relatively high purity. The material so prepared is further purified by a process called zone refining. This technique makes use of the fact that many impurities are more soluble when the metal is in its liquid state so that purification is effected by progressive solidification from one end of a bar of the metal to the other end. In the known methods of zone refining, a narrow molten zone is caused to traverse the length of the metal bar. Generally the bar is supported horizontally in a graphite boat within an inert atmosphere and thus protected from the introduction of impurities. The heating necessary to produce a narrow molten zone is generally accomplished by induction heating emloying coils carrying radio frequency energy and encircling the metal bar. The heating coil then travels slowly along the length of the bar and produces a narrow molten zone which travels along the length of the bar. With this process an extensive physical purification of the substances is achieved. The purification effect is based on the different solubility of the impurities to be removed in the solid and liquid phase of the material and on the evaporation of the impurities from the liquid surface.

Another form of zone refining employs the Czochralski method wherein a crucible maintains the molten material a few degrees above its melting point. A small piece of single crystal called a seed is lowered into the molten material and then slowly withdrawn. By maintaining the temperature conditions properly, a single crystal of the same molecular pattern as the seed grows onto the seed until all of the material is grown.

An improvement to the zone refining technique called the floating zone technique has been introduced whereby the bar of metal is clamped at both ends in a vertical position within a quartz tube. The metal in the molten zone is held in place by surface tension. Doping agents added at one end of the bar may be uniformly distributed throughout the crystal by a single cycle of zone refining. This technique has been successful in producing high quality silicon material. The quality of the material produced has been found to be greatly influenced by the removal of the heat of recrystallization which occurs at the crystallization front which travels with the narrow molten zone. In known processes, it is common to employ water cooling to remove part of the heat in recrystallization. However, the complete removal of the heat of crystallization has been found to be impossible particularly where crystals of large diameter (over 20 mm.) are grown. In these cases, the heat of recrystallization causes a strong rise of the temperature gradient in the crystallization front and its vicinity, even at the most favorable dissipation rates. It is, therefore, been found difficult to maintain the temperature gradient in the vicinity of the recrystallization front as small as possible. This condition is a necessity for the production of high quality single crystals.

It is also important that the recrystallization front traveling within the material bar remain as level as possible. To maintain the recrystallization front as level as possible normally requires additional technical measures and becomes particularly difficult in the production of single crystals of diameters greater than 20 mm.

The known processes have the further disadvantage that the efficiency of the electrical energy required for producing, maintaining and moving the molten zone is very low. This is especially true when inductive coils are used as the heating elements. Moreover it is also a requirement of the known processes to produce a relative movement between the heater and the bar.

Absorbing the heat of crystallization directly at the crystallization front with the aid of the Peltier effect is known in the art. It is further known that the Peltier effect can be utilized for the displacement of the boundary between the solid and molten phase. Although these physical concepts have long been known it has not been possible until now to utilize them practically in zone refining.

It is, therefore, an object of the present invention to provide a simplified method for the production and purification of materials and particularly for single crystal production by employing either the floating zone technique or zone refining whereby the heat of recrystallization occurring in single crystal production is absorbed at the recrystallization front.

It is still another object of the present invention to provide a method of producing high quality crystals by the floating zone technique and maintain the interface boundaries level during the entire growth process of the crystal.

It is still another object of the present invention to provide a method of producing high quality crystals using the floating zone technique whereby the rate of growth of the crystals may be increased by substantially reducing the temperature gradient of the recrystallization front of the crystal bar during formation.

Accordingly, it is the purpose of the present invention to provide a process for obtaining an approximately uniform rate and uniform direction of movement of the crystallizing and melting face boundary of the molten zone produced in the bar-shaped material which is melted along its length and to absorb the heat of recrystallization at the recrystallization front using the Peltier effect or the Peltier and Thomson effect. Accordingly, the bar to be melted is mounted at its ends and cooled while a direct current is passed therethrough having a magnitude corresponding to the Peltier coefficient, or the Peltier and Thomson coefficient of the material. The polarity of the current through the bar may be used to cause cooling or heating at the phase boundary of the liquid zone. Moreover, the current may be utilized for the heating of the entire material. The direct current which is sent through the bar effects either a cooling or heating at the solid-to-liquid and/or the liquid-to-solid interfaces, commonly called the phase boundaries of the molten zone produced in the material by external heating or by other methods. The heating or cooling is caused by the simultaneous or separate occurrence of the Peltier and Thomson effects respectively upon the passage of direct current through the interface of two conductors. The Peltier effect is experienced by the conductive connection between the various conductors, whereas the Thomson effect presupposes the existence of a temperature gradient in the direction of the axis within the solid bar material. The phase boundaries may thus be controlled by either heat production or heat dissipation within the material. The cooled phase boundaries serve as a crystallization area and continuously absorb material from the molten zone by dissipating the heat of crystallization, so that more and more material is effectively crystallized out. Conversely, by heating the phase boundary melting takes place in the direction of the solid phase and gives off heat of fusion so that more and more material will melt. The quantity of positive or negative work (heating or cooling) produced at the material interfaces is dependent on the material. For a pair of conductors designated as 1 and 2 representing the solid and liquid phase respectively, the following relationships apply for a current at a predetermined direction.

$$\pi_{1,2} = -\pi_{2-1} \quad (1)$$

and $$\tau_{1,2} = -\tau_{2-1} \quad (2)$$

wherein the signs of $\pi_{1-2}$ and $\tau_{1-2}$ always remain the same. $\pi$ represents the heat produced by the Peltier effect and $\tau$ the heat produced by the Thomson effect, in $$\frac{\text{Calories}}{\text{amp.-sec.}}$$

The Peltier and Thomson effects thus always mutually support each other at the phase boundaries. When at the solid-liquid phase boundary of a zone heat is produced, the heat at the other phase boundary comprising liquid-solid is dissipated so as to produce within certain material-dependent current densities the desired velocity of the phase boundaries along the same direction and substantially in agreement with the technical purpose.

The heat produced by the Thomson effect serves to support the heat produced by the Peltier effect and often attains the order of magnitude of Peltier effect heat if the differences in temperature along the bar are great enough so as to double the rate of migration of the phase boundaries. The heat produced by the Peltier effect in a given material depends only on (j), the current density;

$$\pi = \pi(j)$$

where $$(j) = \text{Amps. cm.}^{-2}$$

whereas the heat produced by the Thomson effect depends also on the temperature differences between the phase boundary and the end of the bar: $\tau = \tau(j)(T_m - T_E)$, where $T_m$ is the melt temperature and $T_E$ is the temperature of the end of the bar. Therefore, according to the invention, the cooling applied to the ends of the bar is varied. The total heat $Q_T$ which is expressed by $$Q_T = \pi + \tau \left[\frac{\text{Calories}}{\text{amp.-sec.}}\right]$$

for a given current density applied to a given material where: $Q_{T-\tau} = \pi$, where $\tau = 0$ for $(T_m - T_E) = 0$ will increase to a temperature dependent working value $$Q_T = \pi + \tau \text{ for } (T_m - T_E) \neq 0$$

The utilization of the above described process differs with respect to the useful effect for different materials.

According to the invention, with materials having a resistivity $\rho$ where, $$\rho(\text{solid}) < \rho(\text{liquid}) \quad (3)$$

the cooling and heating at the phase boundaries due to the Peltier or Thomson effect or both, is utilized exclusively to achieve an approximately uniform rate of migration and direction of the crystallizing and melting phase boundaries by the current and cooling parameters having been adapted to each other.

On the other hand for materials having a resistivity where $$\rho(\text{solid}) > \rho(\text{liquid}) \quad (4)$$

then the compensation of the heat loss of the liquid zone due to heat radiation and conduction is additionally compensated by an external heat source moved along the length of the bar at a rate dependent on the migration of the phase boundaries.

$\rho$ solid and $\rho$ liquid are the specific resistances of the material in the solid and liquid state, respectively.

Materials which correspond to Formula 3 include most metals; in these, the D.C. current within the liquid zone always produces more heat than in the solid material due to the fact that $\rho$ solid $< \rho$ liquid. Heat losses due to radiation and conduction in the liquid zone are compensated by controlling the current and cooling parameters so that the phase boundaries migrate at such a rate that the average length of the liquid zone is maintained during its passage along the bar. When this process is employed for materials that behave according to Formula 3, the energy required for the relative movement as well as the external heating of the liquid zone is economized.

For materials which behave according to Formula 4, which include most semi-conductor substances such as silicon and germanium, the external heaters are operated only with enough power to compensate for the radiation and heat conduction losses of the liquid zone. The heat provided by the current furnishes the greater part of the energy needed to maintain the melt temperature so that by applying the heat in this manner only a fraction of the electrical energy is required to process the material.

Where an inductive heater serves as the external heat source, it may also be used as an electromagnetic support for the liquid zone. Thus the energy required to produce the liquid zone is substantially reduced by the combination of the external heating with the internal current heating, in employing the current and the external heating to increase the base temperature of the bar to a value below its melting point. By supplying a large portion of the heating of the bar by the current passing within, it is also possible to substantially reduce the size of the high frequency transmitters required to operate the external heating source, or the high frequency voltage sources for electron bombardment operating with smaller power and lower voltage.

These materials have the added advantage, that by employing the Peltier or Peltier and Thomson effect, the resulting heat of recrystallization at the crystallizing phase boundary is absorbed directly by the negative work, (cooling) done by the current and its dissipation is unnecessary. Furthermore, the simultaneous process of absorption, eliminates the sharp rise of the temperature gradient in the crystallization layer, said rise being brought about by the heat of recrystallization. One of the advantages of this process is that the absorption process occurs entirely free of inertia effects. Thus the velocity of the crystal growth which previously was dependent on the quantity of heat carried away to the cooled ends of the crystal and hence dependent on the coefficient of thermal conductivity of the material, its geometric dimensions, and the conditions of the manufacturing process, e.g. the conductivity of the contacts at the ends, is now dependent only on the cooling at the phase boundary which favorably influences the increase of the rate of growth of the crystal, or by application of additional heat conduction, favorably affects said rate of growth.

Moreover, with the materials according to Formula 4 the leveling action of the Peltier effect on the crystallizing phase boundary is utilized. This leveling occurs due to the fact that when irregularities of the intermediate layer occur due to projections of the solid material into the liquid region, there will be a reduction of the current density and hence a reduction of the cooling effect so as to provide a retardation of the movement of this projection into the liquid material and projections are thus made even with the surrounding material. Similar considerations apply for depressions, in which case the surrounding material acts as projection: depressions will melt faster. Thus all irregularities in the crystallization front cancel each other out and it remains level.

The process according to the invention further provides the advantage that the radial temperature gradient in the bar shaped material is substantially reduced or eliminated. Thus when conical peaks of solid material protrude into the liquid zone from both sides, they are eroded by the effect of the internal heating of the direct current on the sides of the liquid zone and additionally by the Peltier effect at the crystallizing or melting intermediate layer. This feature eliminates the difficulties encountered in single crystal formation caused by the growing together of the solid peaks and permit the width of the liquid zones to be substantially reduced.

Actually, the application of the process according to this invention makes it possible, for the first time, to produce single crystals of large diameter and large lengths. Additionally, if the known Dash method is used, it is possible for the first time to produce dislocation-free single crystals having such large outer dimensions.

It is advantageous to perform the zone melting under a high vacuum, as mentioned earlier, to eliminate contamination. In principle this process according to the invention is applicable to all types of systems especially where the equipment operates under high vacuum.

Other objects and features of the present invention will become apparent from the following detailed description considered in connection with the accompanying drawings which disclose two methods of the present invention. It should be understood however that the drawings are designed for purposes of illustration only and not as a definition of the limits of the invention, as to which reference should be made to the appended claims.

In the drawings wherein similar reference characters denote similar elements throughout the views:

FIG. 1 illustrates the process according to the invention for the production of the material according to Formula 3, and FIG. 2 illustrates the process according to the present invention with a heating coil for producing the material according to Formula 4.

Referring now to FIG. 1, a bar 2 mounted vertically at its ends in sockets 1 is connected with terminals of a corresponding stabilized direct current source 4. The cooling applied to sockets 1 may be varied. Upon actuation of switch 5, a current I is applied to the bar 2 and controlled through potentiometer 6. The effect of the current flowing through bar 2 is to produce a molten zone 3. The current density is inversely proportional to the cross sectional area of the vertical bar 2 and can be adjusted by potentiometer 6 so that the molten zone 3 migrates along the length of bar 2 due to the action of the Peltier or Peltier and Thomson effect with a velocity proportional to the current density and the temperature difference $T_m - T_E$. The heat produced by the current of a given strength I per second equals the heat $$Q = 0.239 \cdot I^2 R$$

(in calories) and does not exceed or fall below the heat lost by radiation or conduction at a given cooling rate. When the current density and the cooling is correctly adjusted, the liquid zone 3 moves in a direction depending on the current direction and on the given type of material. The heat quantities Q1, Q2 and Q3 correspond to the radiation losses, and the heat quantities Q4 and Q5 correspond to the conduction losses. They are compensated by $$Q = \sum_1^5 Q_i \tag{5}$$

The construction of FIG. 2 is almost identical to that of FIG. 1 with the addition of external heater 7, a high frequency coil, included as an additional heating element. Bar 2 and heater 7 are movable relative to each other at a velocity V. Because the material is different with respect to that used in FIG. 1, so that $\rho(\text{solid}) > \rho(\text{liquid})$ less current heat per volume and unit time is produced in the liquid zone 3 than in the solid material. Therefore, to maintain the liquid zone 3 with constant length, the heat loss occurring due to Q1 (radiation loss of zone 3) cannot be compensated by the heat produced by the current I and must be maintained by the heating output $Q_L$. Thus, $$Q + Q_2 = \sum_1^5 Q_i \tag{6}$$

Since the greater part of the required energy is furnished by the current heat Q, a relatively small output is required from the heating coil 7. Heater 7 is moved along the length of bar 2 so as to cause liquid zone 3 to travel. Liquid zone 3 is maintained with a constant length during its migration along the bar. In the embodiments of both FIGURES 1 and 2, the sockets 1 are rotating during the migration of the liquid zone along its length.

While only two methods of the present invention have been shown and described it will be understood that many changes and modifications may be made therein without departing from the spirit of the invention as described in the appended claims.

The Dash method mentioned on line 35, column 5 above for the production of dislocation-free crystals of larger diameter and large length is a known method which is described, for instance, in "Journal of Applied Physics," vol. 30, 1959, p. 459.

What is claimed is:

1. A method of zone melting an elongated body of semiconductor material, such as for purifying and single crystal production purposes, which comprises the steps of: passing through the body a direct current of a magnitude corresponding to the Peltier coefficient of the material and to the predetermined migrating speed of the molten zone through the body, maintaining an external heating zone around the molten zone of the body, and moving the heating zone along the body with the migrating speed of the molten zone along the body.

2. A method according to claim 1, wherein the magnitude of the direct current corresponds to the Peltier and Thomson coefficients of the material, and including the step of variably cooling portions of said body remote from said molten zone to influence the Thomson effect in said body.

References Cited

UNITED STATES PATENTS

| | | | |
|---|---|---|---|
| 2,932,562 | 4/1960 | Pfann | 75—10 |
| 3,046,164 | 7/1962 | Domenicali | 75—10 X |
| 3,086,857 | 4/1963 | Pfann | 75—10 |

HYLAND BIZOT, *Primary Examiner.*

DAVID L. RECK, *Examiner.*

H. SAITO, W. W. STALLARD, *Assistant Examiners.*